United States Patent [19]

Remacle et al.

[11] Patent Number: 4,711,728

[45] Date of Patent: Dec. 8, 1987

[54] TREATING SPENT FILTER MEDIA

[75] Inventors: Roger E. M. Remacle, Lasne; Alain A. J. Verbeeck, Brussels, both of Belgium

[73] Assignee: Labofina, S.A., Brussels, Belgium

[21] Appl. No.: 817,953

[22] Filed: Jan. 13, 1986

[51] Int. Cl.$^4$ .............................................. B01D 41/02
[52] U.S. Cl. ........................... 210/772; 210/792; 210/794; 210/797; 210/671; 134/40; 134/25.1
[58] Field of Search ............... 210/792, 795, 797, 798, 210/794, 772, 691, 680, 674, 671, 774; 208/11 GE, 179, 182, 183; 134/40, 25.1

[56] References Cited

U.S. PATENT DOCUMENTS

| | | | |
|---|---|---|---|
| 2,367,384 | 1/1945 | Tymstra et al. | 210/680 |
| 3,574,329 | 4/1971 | Beavon | 210/794 |
| 3,803,031 | 4/1974 | Keller, Jr. | 210/691 |
| 4,104,163 | 8/1978 | Grutsch | 210/794 |
| 4,256,578 | 3/1981 | Kozar | 210/774 |
| 4,260,489 | 4/1981 | Greig et al. | 210/772 |
| 4,501,670 | 2/1985 | Tyson et al. | 210/772 |
| 4,544,491 | 10/1985 | Tyson et al. | 210/772 |

*Primary Examiner*—Benoit Castel
*Attorney, Agent, or Firm*—John K. Abokhair; M. Norwood Cheairs

[57] ABSTRACT

A process for removing sorbed lubricating oil additives from siliceous filter material is provided. The process comprises forming a slurry of the additive-laden siliceous filter material and an aromatic solvent. Water is added to the slurry prior to separating the siliceous filter material from the slurry. The recovered filter material is substantially additive-free. The lubricating oil additives may be optionally recovered from the aromatic solvent by appropriate means such as distillation.

15 Claims, No Drawings

TREATING SPENT FILTER MEDIA

FIELD OF THE INVENTION

The present invention relates to the treatment of spent filter media which have been employed for the filtration or clarification of liquid organic compounds. The invention relates more particularly to recovering these organic compounds which have been sorbed on filter media.

BACKGROUND OF THE INVENTION

In many industries, liquid organic compounds are subjected to a filtration or clarification treatment in order to remove any impurity or contaminants therein.

For example, lubricating oil additives such as wear-protecting agents, anti-oxidants, corrosion inhibitors, detergent-dispersants, etc., must be clear and free from any impurities. Many additives comprise metal salts of organic acids, which may contain sulfur and/or phosphorous. Examples of such additives include phenates of alkaline-earth metals, calcium salts of petroleum sulfonic acids commonly referred to as mahogany acids, alkaline-earth metal salts of oil-soluble sulfonic acids, zinc salts of dialkyldithiophosphoric acids, and the like. The process for producing these additives generally comprises reacting the appropriate metal compound, for example zinc oxide, with the organic acid. Additives are often sold as concentrates, including an inert diluent, preferably a, lubricating oil and one or more additives at a concentration higher than that used in the finished lubricating oil composition. These concentrates are easily handled during shipping and storage. They are readily blended with a further amount of lubricating oil to prepare the finished compositions.

The additives and/or the concentrates (hereinafter referred to as additive or oil additive) are subjected to a filtration or clarification treatment. The selection of the filter medium depends on a number of variables but acceptable results are generally achieved by using siliceous material, such as sand, kieselguhr, diatomaceous earth and the like as filter aids. However, the permeability of the filter medium and the filtration rate decrease progressively. Accordingly, the filter medium which has sorbed appreciable amounts of additive has to be discarded and fresh filter medium is employed for further filtration or clarification treatment. The amount of additive sorbed on a spent filter medium may reach 5% or more of the amount of treated additive. In addition to the loss of valuable additive, disposal of additive-laden filter media presents environmental pollution problems that can only be avoided by treatments requiring substantial expense. These factors are detrimental to the economics of the processes for producing lubricating oil additives.

Some attempts have been made in the past to recover the additives sorbed on spent filter medium by using a solvent and separating the solution of additive and solvent from the treated filter medium. The tested solvents were generally light hydrocarbon oils, such as paraffinic hydrocarbons containing from 5 to 8 carbon atoms, or oxygenated compounds, such as alcohols or ethers. However, this technique has several drawbacks. The additive is generally recovered with a poor yield. Moreover, degradation of some additives occurs during the treatment. Consequently, this recovery method has failed to provide an economically acceptable process.

Other processes have also been suggested, but they are specific for one type of additive or the other. For example, oil soluble alkaline earth metal sulfonates may be recovered from spent filter media by treating with an aqueous solution of an alkali metal hydroxide in two steps and at elevated temperature (U.S. Pat. No. 4,501,670).

There is thus a need for an efficient and easily applied technique for recovering an additive sorbed on a filter medium.

SUMMARY OF THE INVENTION

It is an object of this invention to provide such a technique. A further object of the invention is to provide a technique for additive recovery having wide applicability to additives of different nature or composition. Another object of the invention is to provide a technique for the recovery of at least 90% of the sorbed additives from the filter material. It is also an object of this invention to provide a technique for cleaning an additive-laden filter material.

Accordingly, the present invention provides a process for treating additive-laden siliceous filter material, previously used to filter lubricating oil additives, to recover the sorbed additives therein, comprising the steps of forming a slurry of the additive-laden siliceous filter material and an aromatic solvent. Subsequently, water is added to the slurry to form a dispersion. The dispersion is separated by centrifugation or other similar means into the various solid and aqueous phases. The solvent phase would contain the additives, while the solid phase would comprise cleaned filter material. The additives may be recovered from the solvent phase by distillation or similar means.

DETAILED DESCRIPTION OF THE PREFERRED EMBODIMENTS

The processes for producing lubricating oil additives comprise a filtration or clarification step in order to obtain contaminants-free products which, in some cases, are mixtures of several additives. However, appreciable amounts of additives are sorbed on the siliceous filters and are therefore lost unless otherwise recovered.

According to the technique of the instant invention, the additive-laden filter medium is subjected to an extraction step using a volatile, water-immiscible aromatic hydrocarbon-solvent, such as benzene or a monoor poly-alkylbenzene. It has been found that these solvents are suitable for a wide range of additives and are inert with respect to these additives. The selection of the solvent depends upon some factors, such as price, toxicity, and volatility. For these reasons, toluene and xylenes are preferably used. The additive-laden filter medium and the solvent are brought into direct contact, for instance in a tank provided with a mixing or stirring device, with formation of a dispersion of said filter medium in the solvent. This treatment may be carried out by using either a single-stage process or a multi-stage process.

The amount of solvent which is necessary to extract the sorbed additive from a spent filter medium depends on the solubility power of the solvent, the additive-content of the filter medium, the contact time, the temperature, etc. Acceptable results can be obtained when the amount of solvent is as low as 0.25 parts by weight, based on the weight of additives present in the spent filter cell. On the other hand, amounts of solvent larger than 20 parts by weight would result in an increase in the cost of recovering this solvent during the final step of processing. Generally, the weight ratio solvent: additive in the spent filter medium is from about 1:1 to about 15:1. In one embodiment of the invention wherein toluene is used as the aromatic solvent, efficient operation is achieved by using an amount of said solvent in the range of from about 1 to about 12 parts, based on each part of additive in the additive-laden filter medium.

The extraction treatment may be carried out at room temperature, but it may be desirable to work at a temperature of about 50°-60° C. or higher in order to speed up the extraction rate, the maximum temperature depending on the boiling point and the vapor pressure of the employed solvent. Generally, the mixing time may vary from about 5 to about 30 minutes, depending on other working conditions, such as amount of solvent, mixing speed, and temperature. These working conditions are generally sufficient to insure a superior extraction of the additive from the spent filter medium. It has however been found that the addition of water to the mixture of spent filter medium and solvent permits reaching a high extraction yield. Owing to the presence of water, the amount of residual additive in the purified filter medium recovered at the end of the treatment process of this invention is sharply reduced.

According to an embodiment of this invention, the filter medium is first contacted with the solvent in a mixing tank and water is subsequently introduced into the mixing tank after a period of time which may vary between about 5 and 30 minutes. The mixture is stirred with formation of a pumpable dispersion.

This dispersion is then transferred to a separating device. The separation of the components of the dispersion may be carried out by gravity separation, but it is preferably performed by using a centrifuge, so as to increase the separation rate and the separation efficiency. According to an embodiment of this invention, the separation is carried out by using a centrifuge for the separation of a liquid-liquid-solid mixture, such as an Alfa-Laval centrifuge type SX. The dispersion is separated into a wet cake of cleaned filter medium, an aqueous phase and a phase consisting essentially of a solution of recovered additive in the solvent. The separation step in the centrifuge is generally carried out at room temperature. However, some additives may tend to give rise to the formation of an emulsion in the liquid phases during the centrifugation step. In that case, it is preferred to perform the centrifugation at a temperature of from about 40° to about 60° C.

The obtained results suggest that water forms a liquid barrier around the particles of cleaned siliceous filter medium and therefore prevents any resorption by the latter of the extracted additive in the aromatic solvent. Moreover, the recovered additive is dissolved in the water-immiscible aromatic solvent and is protected against any detrimental action (for example, hydrolysis) of the added water. The minimum amount of water to be used is equal to the interstitial volume of filter medium in the separating device. This interstitial volume depends on the employed separating means and is relatively small when the separation is performed in a centrifuge at high speed. Acceptable results are obtained when the weight ratio of water to treated filter medium is as low as 0.01:1. Amounts of water higher than 5 parts by weight, based on the filter medium, may also be used, but without significant improvement of the results.

Preferably, the weight ratio water:spent filter medium is from about 1 to about 3.

The first phase or solution of recovered additive in solvent is conducted to a distillation column and is separated into an overhead fraction (aromatic solvent) and a bottom fraction (recovered additive). The distillation may be carried out at atmospheric pressures. According to a preferred embodiment of this invention, wherein toluene is the aromatic solvent, the distillation temperature is about 110° C. In case of heat-sensitive additive, the distillation is carried out under vacuum at a lower temperature. The aromatic solvent may be recycled and reused for treating a further charge of additive-laden filter medium.

The solid phase discharged from the centrifuge is a wet cake of cleaned filter medium which is practically free from additive and from solvent. The wet cake is subjected to a dehydrating treatment. This may be accomplished by filtering the cake, for example, in a vacuum filter. The recovered water may be recycled. The partially dehydrated cake is then dried by steam or any other equivalent means.

It has been found that the process of the present invention is applicable for the recovery of a wide variety of additives or mixtures of additives which have been sorbed on siliceous filter media. The additives are recovered with a high yield (i.e. greater than 90% recovery) and without degradation of the products. The treated filter media have a low metals, sulfur and solvent content and are therefore non-polluting wastes.

The following is a specific of an overall process comprising the present invention. Spent filter medium having sorbed additive is introduced into a mixing tank. An aromatic solvent, such as toluene, is also introduced into the mixing tank. The mixture is agitated by means of stirring device with the formation of a dispersion. Water is then introduced into the mixing tank. The mixture is withdrawn and conducted to a centrifuge where it is separated into three phases. The first phase is a solution of extracted additive in the solvent. This phase is conducted to a distillation column where it is separated into an overhead fraction and a bottom fraction. The overhead fraction is the aromatic solvent which is withdrawn and optionally recycled to the mixing tank. The bottom fraction is a wet cake of recovered additive. The aqueous phase is withdrawn from the centrifuge and is also recycled to the mixing tank. The wet cake of cleaned filter medium is discharged from the centrifuge and is introduced into a vacuum filter where it is partially dehydrated. The recovered water which may contain a small amount of aromatic solvent is recycled to the mixing tank. The partially dehydrated cake of cleaned filter medium is conducted to a dryer where it is further dehydrated, for example, by steam. The vapors exiting from the dryer consist mainly of water with a small amount of aromatic solvent which may optionally be condensed and recycled. The cleaned filter medium is withdrawn.

According to another embodiment of the present invention, the treatment of the additive-laden filter medium with the aromatic solvent is carried out in two stages. In the first stage, spent filter medium is contacted with already used (i.e., recycled from second stage) aromatic solvent containing dissolved additive. In the second stage, the partially cleaned filter medium from the first stage is contacted first with aromatic solvent which is free from additive and then with water. The rest of the additive remaining in the filter medium after the first stage is dissolved into the aromatic solvent in the second stage and the resulting solution of additive in the solvent is recycled to the first stage.

More specifically, a first mixing tank is charged with additive-laden filter medium. Aromatic solvent containing dissolved additive and which is recycled from a further stage of the process is also introduced into said first mixing tank. This mixing tank is provided with agitating means to cause intimate dispersal of the solid in the liquid and dissolution of the main part of the additive in the solvent. The slurry is withdrawn from the first mixing tank and is sent to a first separating means. Centrifugation separation is preferably used, for example, in an imperforate bowl conveyor-discharge centrifuge. The partially cleaned filter medium is withdrawn and passed to a second mixing tank. The liquid phase from said first separating means is sent to a distillation column, wherein the additive is separated from the solvent. This solvent is now practically free from additive. It is sent to the second mixing tank. The mixture of partially cleaned filter medium is dispersed in the aromatic solvent, and the additive contained in this filter medium is dissolved in the solvent. Water is then added. The resulting mixture is withdrawn and is sent to a centrifuge, for separation of the liquid-liquid-solid mixture. The recovered solvent containing additive, is recycled to the first mixing tank. Water is recycled to the second mixing tank. The wet cake of cleaned filter medium is discharged from said centrifuge and is introduced into a vacuum filter to be partially dehydrated. The recovered water which may contain a small amount of solvent is recycled to the second mixing tank. The partially dehydrated cake of cleaned filter medium is conducted to a dryer where it is further dehydrated, for example, with steam. The vapors exiting from the dryer consist mainly of water with a small amount of solvent. They may optionally be condensed and recycled. The cleaned filter medium is withdrawn.

At startup, fresh toluene and water are introduced into the second mixing tank. After a steady state condition is reached, small amounts of fresh toluene and water may also be added as a compensation for lost toluene and water.

According to yet another embodiment of the present invention, the purity of the filter medium may be increased by adding a surfactant to the wet cake discharged from the centrifuge. The wet cake is introduced into a tank where it is blended with the surfactant. The obtained mixture is subsequently sent to the vacuum filter. In this case, the waste water exiting from this vacuum filter cannot be recycled.

Further preferred embodiments of the invention are illustrated in the following examples.

Example 1

A spent siliceous filter medium (500 parts by weight) having an additive content of 49.6% by weight was introduced into a mixing tank. The spent filter medium contained 0.16% Ca and 7.6% S.

The tank was also charged with 1740 parts by weight of toluene. The mixture was stirred at room temperature for 5 minutes at 1000 rpm, with formation of a dispersion. Water (1000 parts by weight) was then added to the dispersion.

The dispersion was withdrawn and conducted to a centrifuge. The blend was centrifuged at room temperature for 20 minutes at a g number of 1500.

The solvent/additive liquid phase discharged from the centrifuge was conducted to a distillation column to be separated under a light vacuum (Rotovapor) and at a temperature of 80° C. The overhead fraction was toluene (1556 parts) which was recycled to the mixing tank. The bottom fraction was the recovered additive (248 parts).

The aqueous phase was withdrawn from the centrifuge to be recycled to the mixing tank.

The wet cake discharged from centrifuge was conducted to a vacuum filter. Water (825 parts) was recovered and recycled. The purified and partially dehydrated filter medium (490 parts) was conducted to a dryer to be further dehydrated by steam at about 150° C. The dried filter medium (252 parts) was recovered.

The analysis showed that the residual additive content of the recovered filter medium was 0.7% by weight. The extraction yield was 98.6%. The recovered filter medium was free from organic derivatives of Ca.

By way of comparison, the same procedure was repeated, but without adding water to the mixing tank. The extraction yield was only 62%.

Example 2

The procedure of Example 1 was repeated, but by using an additive-laden filter medium containing 43.7% additive. This spent filter medium contained S (1.42% by weight), Ca (7.9%), Mg (0.08%) and Na (0.1%).

Different runs were carried out at different ratios of toluene:filter medium. The results were the following:

| Ratio Toluene (liters) to Filter Medium (Kg) | Percentage of Remaining Additive |
| --- | --- |
| 1/1 | 23.7 |
| 2/1 | 10.7 |
| 3/1 | 5.7 |
| 4/1 | 4.3 |
| 5/1 | 2.6 |
| 6/1 | 2.4 |
| 7/1 | 2.3 |
| 10/1 | 2.0 |

The analysis of the recovered filter medium in the run carried out at a ratio 5/1 showed that said filter medium contained 0.5% S and 0.22% Ca, but was free from Mg and Na.

EXAMPLE 3

The procedure of Example 1 was repeated, but by using a spent filter medium containing:
S: 9.9% by weight
Zn: 7.5%
P: 7.2%
The purified filter medium contained:
S: 2.4% by weight
Zn: 0.5%
P: 0.5%
The additive sorbed on the filter medium was recovered with a yield of 92.2%. Its I.R. spectrum was the same as the spectrum of the reference product.

EXAMPLE 4

The procedure of Example 3 was repeated, but by using xylene as a solvent.

The additive was recovered with a yield of 91.8%.

The analysis of the purified filter medium gave the following results:
S: 2.2% by weight Zn: 0.6%
P: 0.5%

EXAMPLE 5

The procedure of Example 1 was repeated, but by using a spent filter medium containing 60.1% additive. The analysis of this spent filter cell gave the following results:
B: 3.14%
Zn: 0.035%
S: 0.19%

After treatment, the purified filter medium contained:
B: 0.035%
Zn: 0%
S: 0.11%

The additive was recovered with a yield of 93.3%.

EXAMPLE 6

The procedure of Example 1 was repeated, but with a spent filter medium containing 56.3% additive. Centrifugation was carried out at 40° C.

The analysis of the filter medium gave the following results:

|          | Before Treatment | After Treatment |
|----------|------------------|-----------------|
| S (% by wt) | 1.7           | 0.5             |
| Ca (%)   | 0.42             | 0               |
| Mg (%)   | 6.7              | 0.27            |

The additive was recovered with a yield of 97.5%.

Comparative experiments were carried out, but by using various solvents instead of toluene for treating the spent filter medium. The results were as follows:
hexane:precipitation
methanol:no dissolution of additive
ethylglycol:same
ethyldiglycol:same
ethylacetate:precipitation
hot water (80° C.) : no dissolution

What is claimed is:

1. A process for treating additive-laden siliceous filter material, previously used to filter lubricating oil additives, to recover the sorbed additives therein, said process comprising the steps of:
   (a) forming at room temperature, a slurry of the additive-laden siliceous filter material and an aromatic solvent, said solvent being added in sufficient amounts to give a weight ratio of solvent to additive of from about 0.25 to about 20;
   (b) adding water to said slurry, in an amount of from about 0.01 to about 5 parts per part of filter material;
   (c) separating the siliceous filter material from the slurry to recover substantially additiven-free filter material; and
   (d) recovering the additives from the aromatic solvent.

2. The process of claim 1 wherein the aromatic solvent is toluene, xylene, or any combination thereof.

3. The process of claim 1 wherein said weight ratio is from about 1 to about 15.

4. The process of claim 1 wherein the slurry of additive-laden siliceous filter material and aromatic solvent is agitated for a period of from about 5 to about 30 minutes prior to adding the water thereto.

5. The process of claim 4 wherein the water is added in an amount of from about 1 to about 3 parts per part of filter material.

6. A process for removing sorbed lubricating oil additives from siliceous filter material comprising the steps of:
   (a) forming at room temperature, a slurry of the additive-laden siliceous filter material and an aromatic solvent, said solvent being added in sufficient amounts to give a weight ratio of solvent to additive of from about 0.25 to about 20;
   (b) adding water to said slurry in an amount of from about 0.01 to about 5 parts per part of filter material; and
   (c) separating the siliceous filter material from the slurry to recover substantially additive-free filter material.

7. The process of claim 6 wherein the aromatic solvent is toluene, xylene, or any combination thereof.

8. The process of claim 6 wherein said weight ratio is from about 1 to about 15.

9. The process of claim 6 wherein the slurry of additive-laden siliceous filter material and aromatic solvent is agitated for a period of from about 5 to about 30 minutes prior to adding the water thereto.

10. The process of claim 9 wherein the water is added in an amount of from about 1 to about 3 parts per part of filter material.

11. A process for treating additive-laden siliceous filter material, previously used to filter lubricating oil additives, to recover the sorbed additives therein, said comprising the steps of:
    (a) contacting at room temperature the additive-laden siliceous filter material with a volatile aromatic solvent, said solvent being added in sufficient amounts to give a weight ratio of solvent to additive of from about 0.25 to about 20;
    (b) adding water in an amount of from about 0.01 to about 5 parts per part of filter material to form a dispersion of the filter material in the liquid mixture of solvent and water;
    (c) separating said dispersion by centrifugation into a first phase of additive in said solvent, a second or aqueous phase and a third phase of cleaned filter material;
    (d) distilling said first phase to recover separately a solvent fraction and an additive fraction;
    (e) dehydrating the third phase to recover separately the cleaned filter material and water; and
    (f) recycling the solvent phase from Step (d) and the aqueous phase from Steps (b) and (e) to Step (a).

12. The process of claim 11 wherein the aromatic solvent is toluene, xylene, or any combination thereof.

13. The process of claim 11 wherein said weight ratio is from about 1 to about 15.

14. The process of claim 15 wherein the slurry of additive-laden siliceous filter material and aromatic solvent is agitated for a period of from about 5 to about 30 minutes prior to adding the water thereto.

15. The process of claim 19 wherein the water is added in an amount of from about 1 to about 3 parts per part of filter material.

* * * * *